NEUTRALIZATION SCHEME FOR MULTIPLEX RECEIVER

Filed Aug. 16, 1952 4 Sheets-Sheet 1

INVENTOR.
Orville E. Dow

BY Charles H. Brown
ATTORNEY

Sept. 30, 1958 O. E. DOW 2,854,513

NEUTRALIZATION SCHEME FOR MULTIPLEX RECEIVER

Filed Aug. 16, 1952 4 Sheets-Sheet 2

INVENTOR.
Orville E. Dow

BY Charles H. Brown
ATTORNEY

NEUTRALIZATION SCHEME FOR MULTIPLEX RECEIVER

Filed Aug. 16, 1952 4 Sheets-Sheet 3

INVENTOR.
Orville E. Dow

BY Charles H. Brown
ATTORNEY

NEUTRALIZATION SCHEME FOR MULTIPLEX RECEIVER

Filed Aug. 16, 1952 4 Sheets-Sheet 4

INVENTOR.
Orville E. Dow

BY Charles K. Brown
ATTORNEY

1

2,854,513

NEUTRALIZATION SCHEME FOR MULTIPLEX RECEIVER

Orville E. Dow, Port Jefferson, N. Y., assignor to Radio Corporation of America, a corporation of Delaware Application August 16, 1952, Serial No. 304,719

8 Claims. (Cl. 179—15)

This invention relates to time division pulse multiplex systems, and particularly to the receiver portion of such a system having means for reducing the commutator or channel gate frequency component from the several audio-frequency channel output equipments. By this invention, equivalent performance can be had with the use of less complicated and less expensive channel output filters, or, stated another way, improved performance may be had with channel output filters of a given quality.

This invention is applicable to a time division pulse multiplex system such as is described in detail in U. S. Patent No. 2,543,738, issued on February 27, 1951, to William D. Houghton. Briefly, in such a system, the modulating signals from a number of separate audio channel inputs at the transmitter are combined into a complex pulse type wave wherein one cycle of operation includes, sequentially, an amplitude modulated pulse from each message channel and a synchronizing pulse. After the pulse wave is recovered from a radio frequency carrier at the receiving end of the system, the synchronizing pulses are taken off to generate a series of gate pulses which make the receiving channel units operate sequentially and at a time when the modulated pulse assigned to the corresponding channel is present. In other words, the pulse wave is coupled to all receiving channels and the channels are made operative sequentially by the gate pulses.

By way of example, the system may provide for the simultaneous transmission of twenty-four messages in the audio range between 300 and 3400 cycles per second. Each message channel may be allotted an interval of five microseconds. One complete cycle of operation will then last for 120 microseconds, which corresponds to the period of an 8,333 cycle per second wave. Each channel output in the receiver would include, in addition to the message frequencies between 300 and 3400 cycles per second, an undesired audible commutator or channel gate fundamental frequency component of 8,333 cycles per second, were it not eliminated by some means. The amplitude of the undesired 8,333 cycle per second wave is high relative to the amplitude of the message components, and while it can be removed solely by the use of high quality filters, a more economical and satisfactory solution has been needed. It is therefore a primary object of this invention to provide a method of and means for the neutralization or cancellation of the undesired channel gate fundamental frequency components in the various channel output units.

According to a feature of this invention, the channel gate fundamental frequency component in one channel output equipment is applied to the channel output equipment of another channel, and vice versa, in such a manner that the channel gate fundamental frequency components cancel or neutralize each other. The cross couplings are made between channels which are 180 degrees apart in phase, considering one complete cycle of operation to correspond with 360 degrees. The channel gate fundamental frequency components (all 8,333 cycles per

2 second in the example but displaced in phase) in all the channel output equipments may be neutralized in this manner.

A more detailed description of the invention will now be made with reference to the accompanying drawing, wherein:

Fig. 2 is a group of curves on a common time axis, which represent voltage variations at various point in the multiplex receiver and which will be used in explaining the operation thereof.

Figure 1:
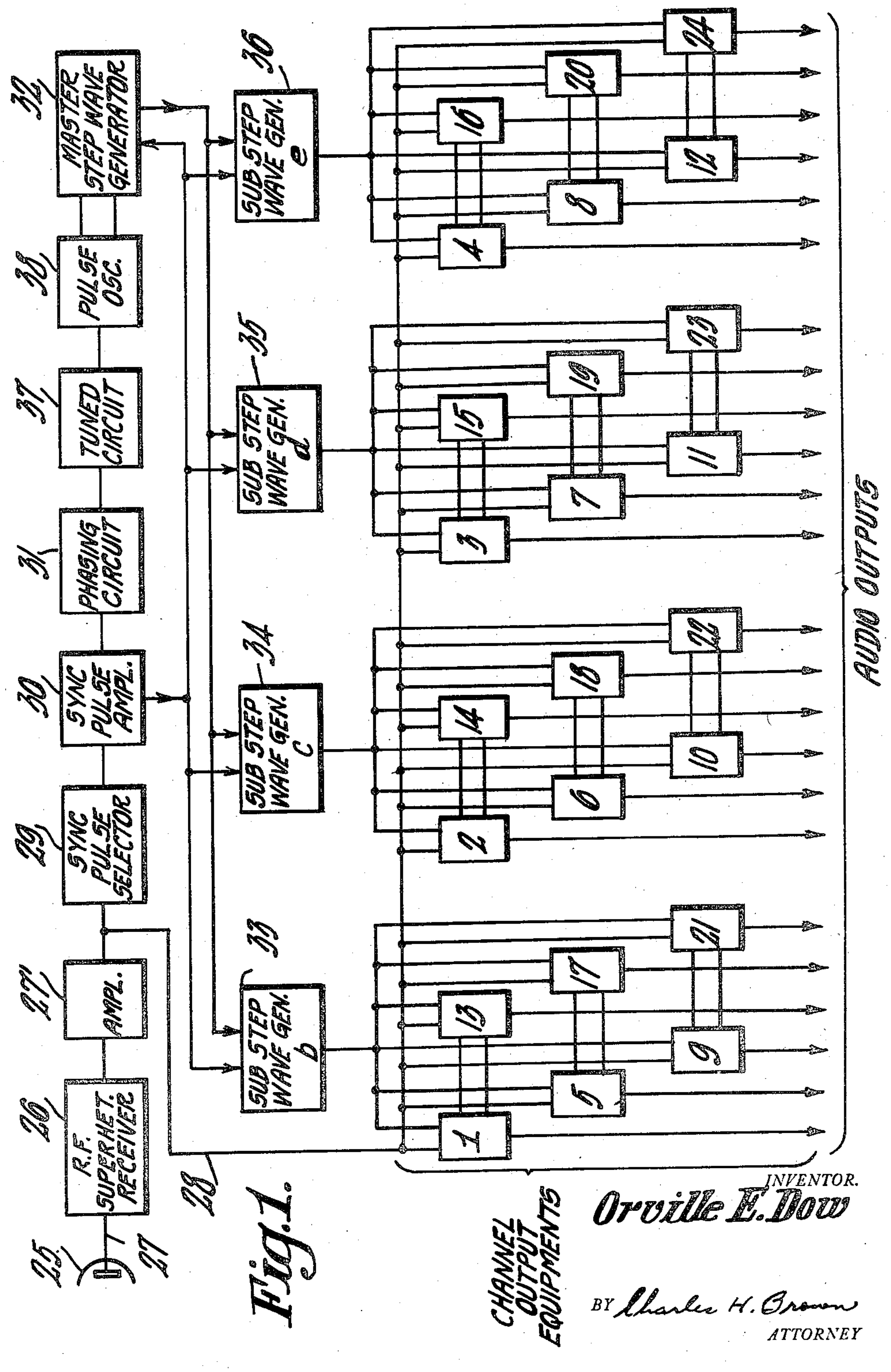
Fig. 1 is a block diagram of a time division pulse multiplex receiver incorporating the present invention, wherein the numbered boxes corresponding to channel output equipments are cross coupled.
Figure 1:
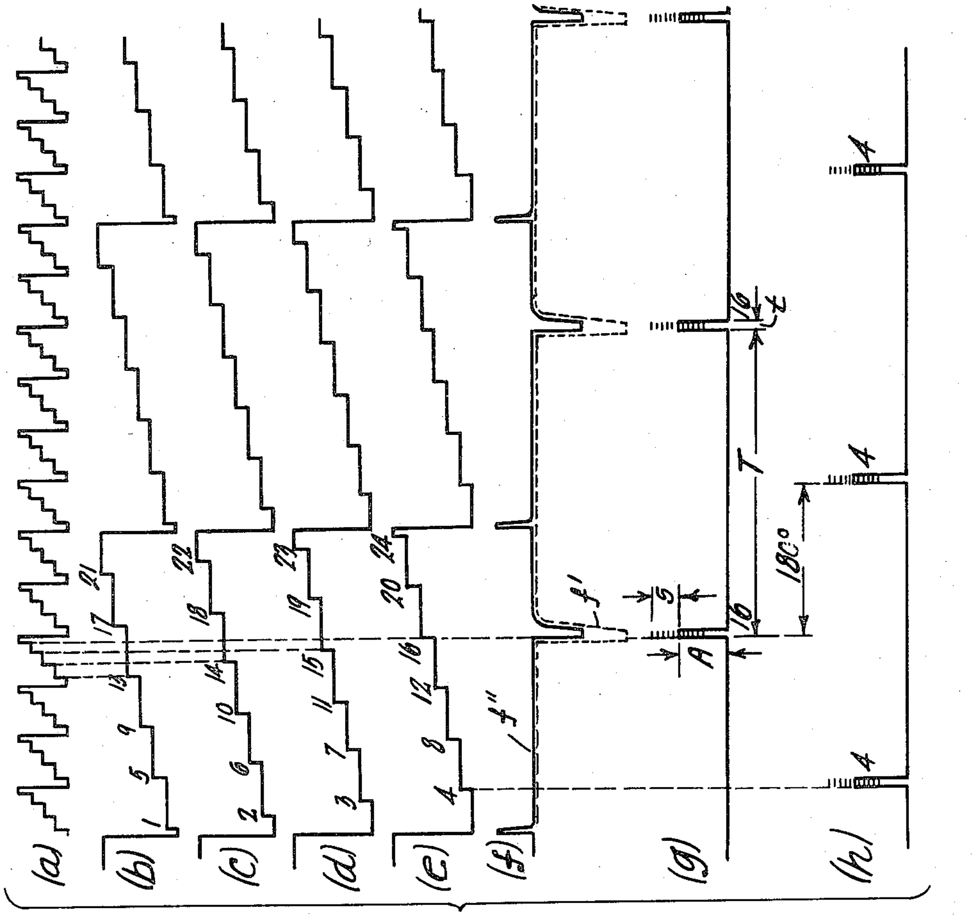

Referring to Fig. 1 which shows diagrammatically the receiving multiplex equipment, the radio frequency waves are picked up on antenna 25 and are coupled to a radio frequency superheterodyne receiver 26 via transmission line 27. The radio frequency receiver demodulates the radio frequency signals and re-establishes on its output terminals the pulse train. The output of receiver 26 is coupled to an amplifier 27', the output of which is coupled via lead 28 to all receiving channel units numbered 1 through 24 in an electrically parallel manner. The output from the amplifier 27' is also coupled to a synchronizing pulse selector 29. The synchronizing pulse selector 29 selects or separates the synchronizing pulses from the channel pulses by virtue of certain distinguishing characteristics and produces a pulse which is applied to synchronizing pulse amplifier 30. By way of example only, the synchronizing pulses may be distinguished from the message wave pulses on an amplitude and/or width basis. Synchronizing pulse amplifier 30 has two outputs, one of which is connected to a phasing circuit 31 and the other to a master step wave generator 32 and substep wave generators 33, 34, 35 and 36. The phasing circuit 31 produces a pulse whose occurrence time is made to be manually adjustable to compensate for time delays in the circuits of the receiving equipment.

The positive pulses from phasing circuit 31 are coupled to a tuned circuit 37 which produces a slightly damped sine wave of frequency equal to that of the crystal in the transmitting equipment. This damped wave is coupled to and locks in a pulse oscillator 38. The pulses from oscillator 38 are coupled to master step wave generator 32 which produces on its output terminals a step voltage wave as indicated in Fig. 2*a*. The step wave output from the master step wave generator is coupled to four substep wave generators 33, 34, 35 and 36, which produce step waves interleaved on different risers of the step wave output from generator 32. The outputs of the four subsetp wave generators are as shown by curves *b*, *c*, *d* and *e* of Fig. 2. The output of substep wave generator 33 (Fig. 2*b*) is applied to channel output units 1, 5, 9, 13, 17 and 21. The outputs of substep wave generators 34, 35 and 36 are each similarly applied to six different channel output units as illustrated in Fig. 1.

Figure 4:
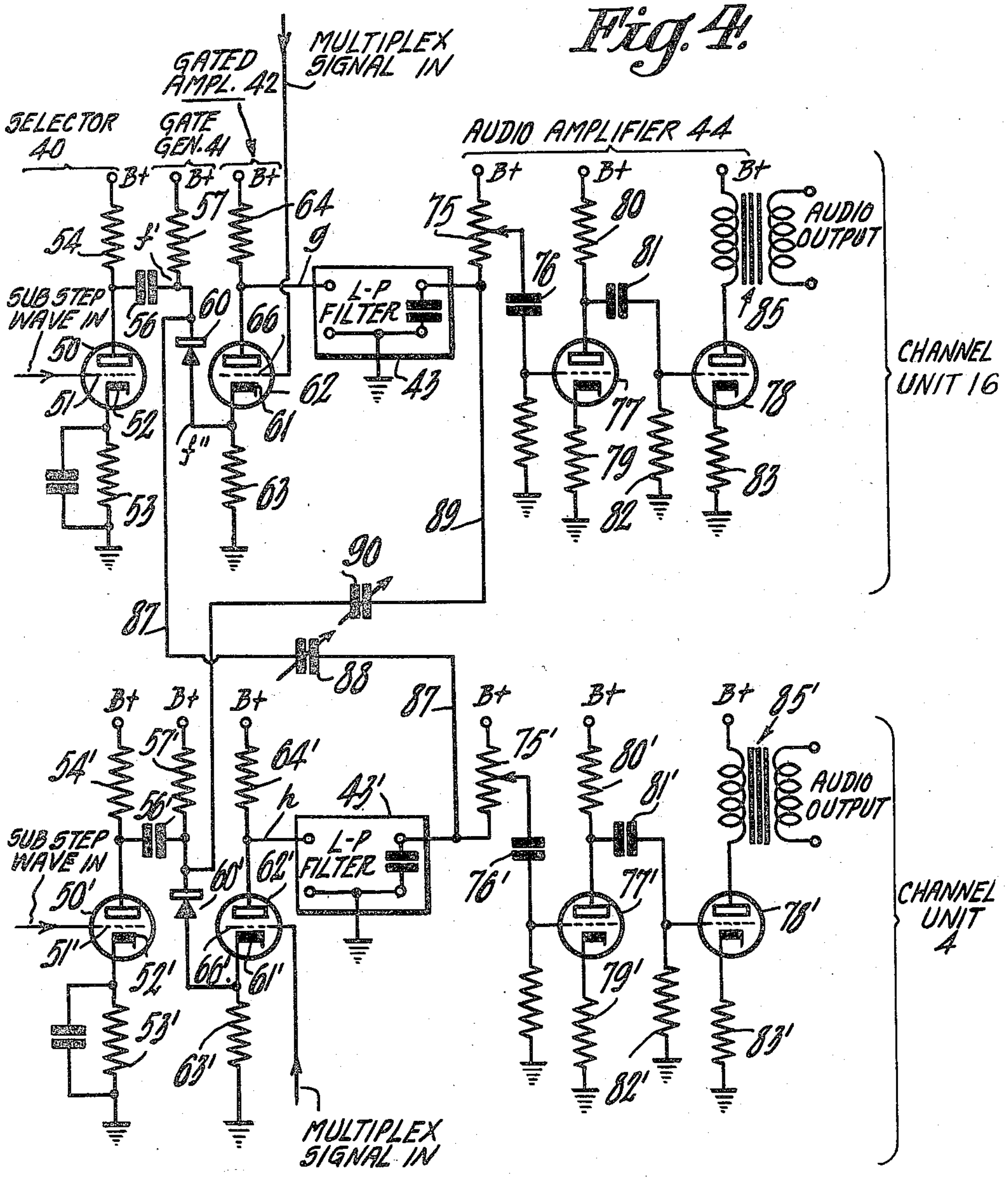
Fig. 4 is a detailed circuit diagram of two channel output equipments cross coupled in accordance with the teachings of this invention.
Figure 3:
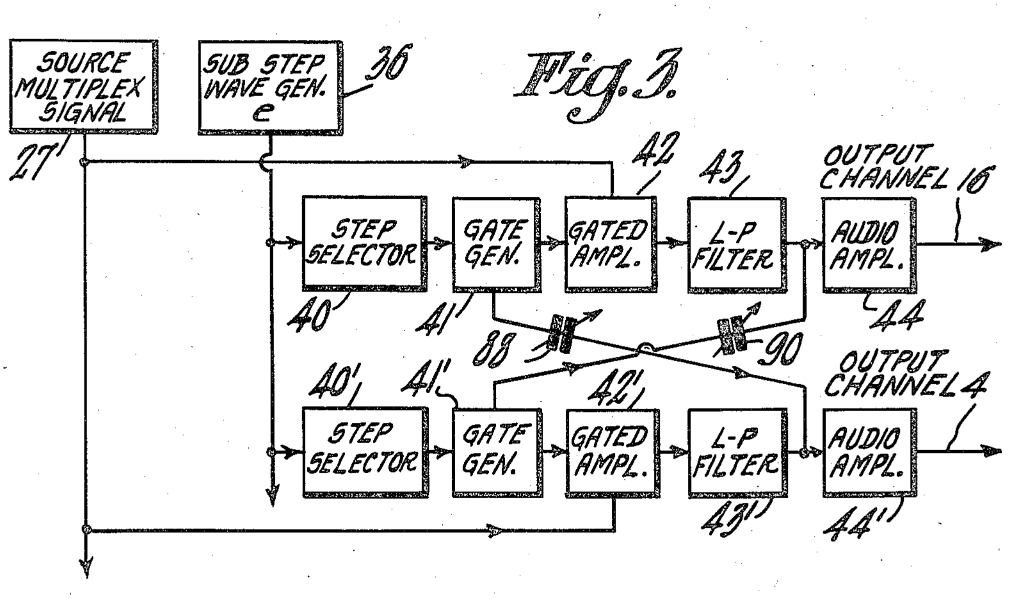
Fig. 3 is a block diagram of a portion of the receiver circuit shown in Fig. 1, two of the channel output equipments of Fig. 1 being shown to consist of five circuits, and the cross couplings between these equipments being illustrated.

Each output channel unit, designated 1 through 24, includes, as shown in Fig. 3, a channel position selector 40, a gate generator 41, a gated amplifier 42, and an output circuit for the gated amplifier 42 including a low-pass filter 43 and an audio amplifier 44. Details of these circuits are shown in Fig. 4.

Reference will now be made to the circuit diagram of Fig. 4 for a description of the operation of channel output unit 16 when receptive to a substep wave as illustrated in Fig. 2*e* from substep wave generator 36. The other channels operate in a similar manner. A selector tube 50 is receptive to substep wave, curve *e* of Fig. 2, on its grid 51. The cathode 52 is connected to ground through a biasing resistor 53 which biases tube 50 normally to cut-off so that it conducts from the time of a particular riser of the step wave, in this case riser designated 16, until the discharge time of a substep wave. In the different channels, the different selector tubes are differently biased to cut off and become sequentially operative on different risers or amplitude values of the substep wave. When tube 50 conducts, a negative pulse is generated across anode resistor 54. The leading edge of this pulse induces a transient pulse at the junction between capacitor 56 and resistor 57, which transient is represented as *f'* in Fig. 2*f*. A diode 60 is connected between the junction point and cathode 61 of a gated amplifier 62. Cathode 61 is connected through cathode resistor 63 to ground and the anode of tube 62 is connected through a resistor 64 to positive potential. Diode 60 is normally conducting but is cut off when a negative pulse *f'* appears on its anode. The gated amplifier 62 is normally biased to cut off by the direct current flowing through resistor 57, diode 60 and cathode resistor 63. The value of cathode resistor 63 is chosen so that when diode 60 is cut off, gated amplifier 62 acts as a class A amplifier, that is in the linear portion of its grid voltage-anode current characteristic curve. Resistor 57 is chosen to have a value which will provide the desired amplitude of voltage drop across cathode resistor 63 when diode 60 is conducting.

The multiplex signal, such as from the amplifier, 27' of Fig. 1, applied to all channel output units in parallel, is applied to the grid 66 of gated amplifier 62. Diode 60 is cut off for a period of time equal to the duration of the desired portion of the multiplex signal input for that particular channel. The result is that gated amplifier 62 is made conducting for the period of time when a message signal from a particular channel, for example channel 16, is present on its grid. The pulse is amplified by tube 62 and coupled to a low pass filter 43.

Anode resistor 64 is of a value such that the filter is driven from its proper impedance. The filter is terminated by a potentiometer 75 which has an impedance equal to the terminating impedance required by the filter. A tap on potentiometer 75 provides a means of manually adjusting the amplitude of the signal applied to the audio amplifier 44 which consists of two triodes 77 and 78 operated as class A amplifiers. The grid of amplifier tube 77 is connected to the tap on potentiometer 75 via coupling capacitor and bias is supplied by means of resistor 79. The amplified audio signal developed across anode resistor 80 is coupled to the grid of amplifier tube 78 via coupling capacitor 81. Resistor 82 provides the ground return path for the grid of tube 78. Resistor 83 is an un-bypassed cathode degeneration resistor in the cathode circuit of tube 78. Transformer 85 in the anode circuit of tube 78 is an output type transformer which matches the impedance of tube 78 to the otuput line impedance.

The channel output unit for channel 4 is the same as that described for channel 16 and the elements in the two units bear the same numerals with prime designations. A cross coupling between output unit 16 and channel output unit 4 supplied with waves from the same substep wave generator, is provided by a wire 87 connected from the gate generator of unit 16 through a capacitor 88 to the output of filter 43' of channel output unit 4; and a wire 89 connected from the gate generator of output unit 4 through a capacitor 90 to the output of filter 43.

The output of gated amplifier tube 62 in channel output unit 16 is as represented in Fig. 2*g*. Each pulse is amplitude modulated with the audio message frequency components of channel 16. The output of gated amplifier tube 62' in channel output unit 4 is as represented in Fig. 2*h*. It will be noted from an inspection of Fig. 2 that the fundamental frequency component of the gating pulses in channel output units 16 and 4 are 180 degrees apart in phase, and are cross coupled through capacitors 88 and 90. The fundamental frequency component in one cross-coupling is of such amplitude and phase as to balance or neutralize the fundamental frequency component in the output of the filter in the channel to which it is connected. When there are an even number of output channel units, all channel output units can be grouped into pairs which have gating pulse fundamental frequency components which are 180 degrees out of phase. In the system of the present example with twenty-four channels, the cross coupled pairs of output units may be as shown in Fig. 1.

Figure 5:
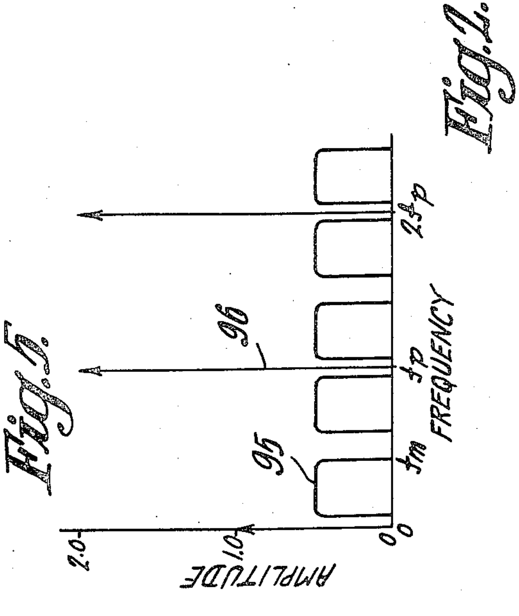
Fig. 5 is a chart showing the relative amplitudes of various frequency components present in each channel output equipment.

The output of each gated amplifier, represented in a chart of amplitude vs. time in Figs. 2*g* and 2*h* for channels 16 and 4, is made up of various frequency components according to Fourier analysis. An amplitude vs. frequency chart of the frequency components will be as represented in Fig. 5 where envelope 95 represents the message frequency components between 300 and 3,400 cycles per second, and 96 represents the frequency component (8,333 cycles per second in this example) which is the fundamental frequency of the gating pulse.

Figure 9:
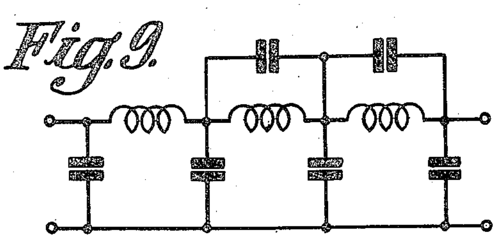
Fig. 9 is a circuit diagram of a low-pass filter such as may be used in the channel output equipments.

Filter 43 of Fig. 4 should transmit only the desired audio frequency components 95. The relative amplitudes of the frequency components in the output of gated amplifier tube 62 determine in part the transmission characteristics required of filter 43. The construction of filter 43 may be as illustrated in Fig. 9, but other constructions well known to those skilled in the art may be employed.

In time division multiplex systems, the repetition rate of the channel gate must be not less than twice the highest modulation frequency to be transmitted by each channel. Standard telephone practice dictates that this highest modulation frequency be 3,400 cycles per second. A high repetition rate for the channel gate permits the use of a filter of comparatively low cost, but increases the frequency band required by the multiplex signal. A good compromise for the channel gate repetition rate is 2.5 times the highest modulation frequency. Thus the period T (Fig. 2*g*) of the channel gate will be about 120 microseconds. The length *t* of the current pulse in gated amplifier tube 62 will depend upon the number of channels in the system. In the interests of low cross-talk characteristics, the channel gate duration time should not be greater than half the total time allotted to the channel. Thus in a 24 channel system where the time allotted to each channel is 5 microseconds, the duration time *t* of the current pulse in tube 62 should be about 2.5 microseconds. Let the mean (unmodulated) amplitude of the current pulse of Fig. 2*g* be A, and its peak variation due to modulation be S. The degree of modulation of the pulse will then be $M=S/A$. To reduce amplitude distortion the peak value of S is usually made not greater than half of A, thus the current pulse is modulated 50 percent, $M=.5$. We are now ready to determine the relative amplitudes of the various sinusoidal components in the wave of Fig. 2g.

The average or D.-C. current is equal to $$A\frac{t}{T}$$

This is not transmitted to the output terminals because of the capacitances 76 and 81 and the transformer 85. The message frequency components may be between 300 cycles per second (the lowest frequency required to be transmitted in telephone service) and 3,400 cycles per second. Its peak amplitude will be $$MA\frac{t}{T}$$

These components must be transmitted through the filter 43 with a minimum of attenuation. The fundamental of the current pulse has a frequency of 8,333 cycles per second (corresponding to a period of 120 microseconds) and a peak amplitude of $$2A\frac{t}{T}\left(\sin \pi\frac{t}{T}\Big/\pi\frac{t}{T}\right)$$

which for the values of $t$ and T assumed is approximately equal to $$2A\frac{t}{T}$$

This fundamental component is also amplitude modulated the same amount as the direct current component and has sidebands above and below 8,333 cycles per second with a peak amplitude of $$MA\frac{t}{T}$$

The lower sidebands will fall in the frequency bank extending from 4,933 to 8,033 cycles per second and the upper sidebands will fall in the frequency band extending from 8,633 to 11,733 cycles per second. There are other components corresponding to the harmonics of the current pulse fundamental frequency, and sidebands about each harmonic. However, the fundamental and its sidebands are the most prominent factor in the filter design. Fig. 5 shows the components of the current pulse of Fig. 2g. The lines with the arrows indicate the amplitude of the direct current, fundamental, and second harmonic components. The envelopes represent the message frequencies and the sidebands which, of course, are only present when the channel is being modulated. The repetition rate of the current pulse is $f_p$ and the highest frequency to be transmitted by the channel is $f_m$.

The component with a frequency equal to $f_p$ is in the audible range and is four times or 12 db higher than the message frequency components. Moreover, this component is present even when there is no modulation on the channel and hence can be easily heard if its level is greater than −50 db with respect to the message frequency components. For good telephone service the components above the message frequency pass-band should be at least 60 db below the maximum amplitude of the base frequency components, i. e. components below frequency $f_m$. This means that the attenuation of the filter 43 of Fig. 4 must be at least 72 db greater at $f_p$ than at $f_m$. By the method of this invention the attenuation requirement of filter 43 at frequency $f_p$ can be reduced.

A component 180 degrees out of phase with the component $f_p$ is coupled to the output of filter 43 so as to balance $f_p$ to near zero amplitude. The balancing component is obtained from a channel displaced in time by half a period of $f_p$ with respect to the occurrence time of the channel from which the $f_p$ component is being removed. This balancing component may be taken from the anode or cathode of diode 60. The voltages at these points are represented in Fig. 2f. The gate pulse voltage ($f''$ of Fig. 2f) at the diode cathode of any channel is the same polarity as the pulse voltage ($f'$ of Fig. 2f) at the diode anode of that channel. In a system with 24 channels the fundamental components of the gate pulses are successively displaced by 15 degrees as shown by the vectors in Fig. 6. Thus the $f_p$ component of the gate pulse of channel No. 13 is 180 degrees out of phase with the $f_p$ component at the output of filter 43 of channel No. 1, if the phase shift of this component through the filter is zero or a multiple of 360 degrees. Since the $f_p$ component of the gate pulse at the diode may be of the order of 1,000 times as large as the $f_p$ component at the filter output terminal, very small capacity coupling between the gate generator of channel 16 and the output of filter 43' should balance the $f_p$ component at the filter output to zero.

In the case where the $f_p$ component is shifted in phase in transmission through filter 43, it will be necessary to use the gate pulse of another channel which is not displaced exactly 180 degrees with respect to the channel from which the $f_p$ component is being removed. With a 24 channel system a balancing component can always be found which is within $^{15}\!/\!_2$, or 7½ degrees of the correct phase. This maximum phase error will permit a reduction of about 12 db in the $f_p$ component at the channel output terminals. If a greater reduction is required, the balancing components from two adjacent channels can be combined to give a resultant which has a phase intermediate to the phases of the two channels.

In Fig. 4, the $f_p$ component at the output of filter 43 is balanced by capacitor 90 connected to the gate generator of unit 4. Likewise, the $f_p$ component at the output of filter 43' is balanced by capacitor 88 connected to the gate generator of unit 16. The impedance to ground at the output terminal of the filters is generally a capacitive reactance so that a capacitor (88 or 90) in series therewith forms a voltage divider. The size of capacitor 88 or 90 may be varied to reduce the $f_p$ component to a minimum. The same cross coupling is used between other pairs of channel output units to reduce the fundamental of the gate pulse in the channel outputs.

This neutralizing process increases the amplitude of the $2f_p$ component, but this component, but this component is further from the desired cut off frequency $f_m$ and is easily discriminated against in an inexpensive filter. Also, the $2f_p$ component is near the upper range of audibility where the response of telephone receivers and amplifiers is low.

Figure 7:
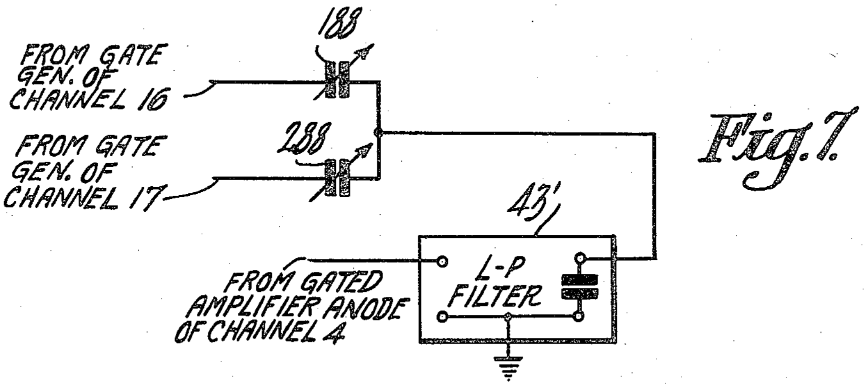
Fig. 7 is a circuit diagram illustrating a scheme which may be employed when there are no two channel output equipments having gating components 180 degrees apart.
Figure 8:
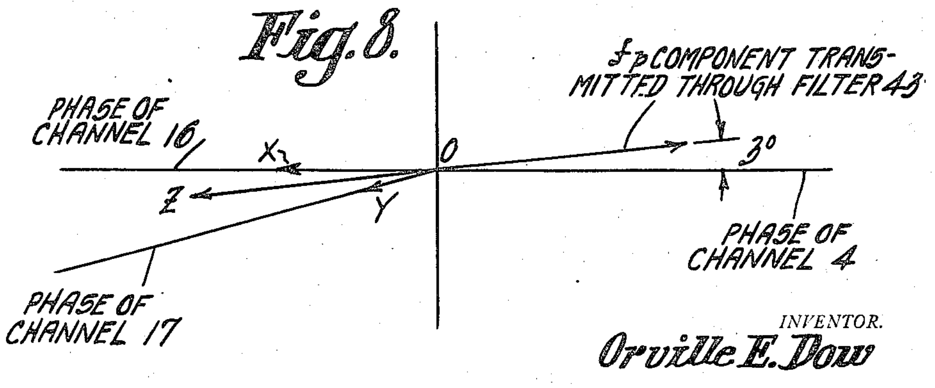
Fig. 8 is a chart of phase relations which will be used in explaining Fig. 7.

Reference will now be made to Figs. 7 and 8 for a description explaining how the balancing components from two adjacent channels can be combined to give a resultant balancing component which has a phase intermediate the phases of the two channels. This refinement may be desirable where there is a phase shift in filters 43 such that there are no two $f_p$ components exactly 180 degrees out of phase.

Figure 6:
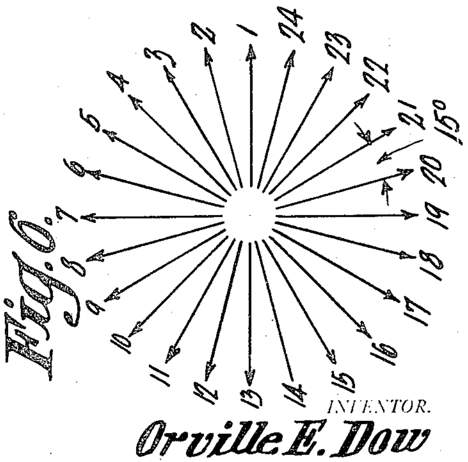
Fig. 6 is a chart illustrating the phase relationships between the gating pulse frequency components in the twenty-four channel output equipments of the system illustrated in Fig. 1.

Assume that for a particular multiplex terminal the phase shift of the $f_p$ component through the filter 43' of Fig. 4 is 3 degrees greater than an integral multiple of 360 degrees. For a 24 channel system as represented in Fig. 6 the required neutralizing voltage for channel 4 would lie between channels 16 and 17. Fig. 8 represents the assumed phase relations. The vector Z represents the phase and amplitude of the neutralizing voltage which must be applied across the output terminals of filter 43' in order to balance to zero the $f_p$ component which was transmitted through the filter. The capacitor 88 of Fig. 4 is replaced by two capacitors 188 and 288 in Fig. 7. Capacitor 188 is connected to the anode of diode 60 in the gate generator of channel 16. Capacitor 288 connects to the anode of the corresponding diode in the gate generator of channel 17. The other terminals of capacitors 188 and 288 are connected to the output terminal of filter 43'. The $f_p$ component in the gate of channel 16 is attenuated by capacitor 188 and appears across the output terminal of 43′ with the phase and amplitude of vector X of Fig. 8. Vector Y represents the attenuated $f_p$ component from channel 17 as it appears at the output terminal of 43′. The vectors X and Y combine to form Z. By adjusting capacitors 188 and 288 differentially the phase of Z can be varied between the limits of the phase of channel 16 and the phase of channel 17. If the capacitors 188 and 288 are varied together the amplitude of the balancing component Z varies and the phase remains fixed. In all cases the capacitance C which is the shunt element across the output terminals of 43′ is many times larger than capacitors 88, 90, 188 or 288.

What is claimed is:

1. The combination of: a plurality of channel units each including a gate generator, a gated amplifier following said gate generator and responsive thereto and a low-pass filter in the output of said gated amplifier; means for energizing said gate generators in a sequence which continuously repeats, whereby undesired gating frequency components appear in the output of the gated amplifier, the fundamental gating frequency component in all of the channels being at the same frequency but at different phases; and cross couplings between gate generators and low-pass filters in pairs of channel units wherein the fundamental gating frequency components are substantially out of phase.

2. The combination of: a plurality of channel units each including a gate generator, a gated amplifier responsive thereto and a low-pass filter; means for energizing said gate generators in sequence; and cross coupling between the gate generator and low-pass filter of one channel and the gate generator and low-pass filter of another channel, the channels being selected for having fundamental gating frequency components substantially out of phase.

3. In a time division pulse multiplex receiver, the combination of a plurality of channel output equipments each including a step selector, a gate generator responsive thereto, a gated amplifier responsive to said gate generator and a low-pass filter receptive to the output of said gated amplifier, a source of step waves coupled to said step selectors, a source of time division pulse multiplex signal applied in parallel to said gated amplifiers, and cross coupling between gate generators and low-pass filters in pairs of channel units wherein the fundamental gating frequency components are substantially out of phase.

4. In a time division pulse multiplex receiver, the combination of a plurality of channel output equipments each including, in circuit, a step selector, a gate generator, a gated amplifier, a low-pass filter and an audio amplifier, a source of step waves coupled to said step selectors, a source of time division pulse multiplex signal applied in parallel to all said gated amplifiers, and means for coupling the gating pulse fundamental frequency component in one gate generator with an audio amplifier of another channel equipment wherein the gating pulse fundamental frequency component is displaced substantially 180 degrees; whereby there is a cancellation of the gating pulse fundamental frequency component.

5. In a time division pulse multiplex receiver, the combination of: a plurality of channel output equipments each including, in the order named, a step selector, a gate generator, a gated amplifier, a low-pass filter and an audio amplifier; a source of step waves coupled to said step selectors, said selectors being differently biased and operative on different risers of said step wave; a source of intelligence waves applied in parallel to all said gated amplifiers; and means for coupling the gate generator in one channel with an audio amplifier in another channel to produce a cancellation of the undesired fundamental gating frequency component in the audio amplifier of said other channel.

6. In a time division pulse multiplex receiver, the combination of a plurality of channel units each including a gate generator, a gated amplifier coupled to said gate generator and an output circuit coupled to said gated amplifier, means to apply a pulse train signal to said gated amplifiers, means to successively energize said gate generators, and means to couple a portion of the output of the gate generator in a first one of said channel units to the output circuit of a second one of said channel units, the gate generators of said first and second channel units being energized 180 degrees out of phase, whereby the fundamental gating frequency component in the output circuit of said second channel unit is substantially cancelled by the fundamental gating frequency component from said first channel unit.

7. In a time division pulse multiplex receiver, the combination of a plurality of channel units each including a gate generator, a gated amplifier coupled to said gate generator, and an output circuit coupled to said gated amplifier, a source of a pulse train wave coupled to said gated amplifiers, electronic distributor means to successively energize said gate generators, and cross-couplings between said channel units, said cross-couplings being operative to couple portions of the outputs of said gate generators to said output circuits so that fundamental gating frequency components in the output circuits are substantially cancelled.

8. In a multiplex system, the combination of a plurality of channel units each including a gate generator, and a gated amplifier following and responsive thereto, means for energizing said gate generators in a sequence which continuously repeats, whereby undesired gating frequency components appear in the output of the gated amplifier, the fundamental gating frequency component in all of the channels being at the same frequency but at different phases, and a coupling from the gate generator in each of said channel units to the gated amplifier in another channel unit wherein the fundamental gating frequency component is substantially out-of-phase.

References Cited in the file of this patent

UNITED STATES PATENTS

| | | |
|---|---|---|
| 2,509,064 | Huber | May 23, 1950 |
| 2,543,738 | Houghton | Feb. 27, 1951 |
| 2,546,935 | Trevor | Mar. 27, 1951 |
| 2,580,421 | Guanella | Jan. 1, 1952 |

UNITED STATES PATENT OFFICE
CERTIFICATE OF CORRECTION

Patent No. 2,854,513 — September 30, 1958

Orville E. Dow

It is hereby certified that error appears in the printed specification of the above numbered patent requiring correction and that the said Letters Patent should read as corrected below.

Column 3, line 68, after "capacitor" insert -- 76, --.

Signed and sealed this 30th day of December 1958.

(SEAL)

Attest:

KARL H. AXLINE
Attesting Officer

ROBERT C. WATSON
Commissioner of Patents